Patented July 29, 1930

1,771,460

UNITED STATES PATENT OFFICE

LEON LILIENFELD, OF VIENNA, AUSTRIA

CELLULOSE SOLUTIONS AND PROCESS FOR THEIR PRODUCTION

No Drawing. Application filed May 10, 1924, Serial No. 712,475, and in Austria June 5, 1923.

I have discovered that strong organic bases, particularly quaternary ammonium bases or those bases in the aqueous solutions of which a highly electrolytic dissociated hydroxide is assumed to be present or mixtures of substances which are capable of forming strong organic bases, exercise a solvent action on cellulose, its conversion products or suitable derivatives. This solvent action of strong organic bases is enhanced in presence of alkali.

My invention relates to a process for making cellulose solutions based on the foregoing discovery.

The fact that strong organic bases, particularly quaternary ammonium bases or those bases in the aqueous solutions of which a highly electrolytic dissociated hydroxide is assumed to be present, have a dissolving effect on cellulose or its conversion products, is not only surprising in itself. It must be described as entirely unexpected, that the solvent action of these bases even exceeds that of caustic alkalies, so far as such action exists. The more powerful solvent action of the strong organic bases is evident from the fact, for example, that whereas caustic alkali lyes are able to dissolve mercerized cellulose or bleached cellulose or bleached and mercerized cellulose or certain cellulose conversion products obtained from cellulose solutions, such as the cellulose hydrate regenerated from viscose, including viscose silk, or the cellulose conversion product obtainable from ammoniacal solutions of cupric oxide by precipitation, including copper silk and the like, only at low temperatures, such bodies from the cellulose group are dissolved even at room temperature in aqueous solutions of strong organic bases, for example a solution of 20-50 per cent. strength of tetra-ethylammoniumhydroxide or tetramethylammoniumhydroxide or phenyltrimethylammoniumhydroxide or guanidine. Thus, according to the particular nature of the body from the cellulose group to be dissolved, the solvent action of the strong organic bases or of their aqueous solutions, in presence or absence of alkalies, takes effect either at room temperature or at a higher temperature or at a temperature between room temperature and 0°, or only below 0°.

Thus, for example, those conversion products which may be obtained by separation from solutions of cellulose in suitable solvents (for example strong mineral acid, ammoniacal cupric oxide, zinc chloride) or from viscose, dissolve in suitable bases or aqueous solutions thereof in presence or absence of alkali even at room temperature. Mercerized cellulose or bleached cellulose or bleached and mercerized cellulose, according to the degree of mercerizing or bleaching, dissolves either at room temperature or between room temperature and 0° or not very far below 0°, whereas slightly disintegrated or not disintegrated cellulose dissolves only below 0° in the bases or aqueous solutions thereof in presence or absence of alkalies. In every case it is easy to determine the proper temperature by a simple preliminary test, namely by mixing the cellulosic body with the desired base or solution thereof in water alone or in presence of alkali and, if no solution occurs at room temperature, cooling by stages until a solution is produced.

Hereinafter the conduct of the process is described and illustrated by examples. It is, however, expressly emphasized that it is not intended to limit the invention to the details of this description.

As parent materials for the present process the following may be named by way of example:

(1) Bleached or unbleached cellulose of every kind and in every form in which it is available;

(2) Every kind of matter containing cellulose;

(3) Those conversion products which are formed by mechanical comminution (for example grinding or shredding) of the cellulose in presence of water;

(4) Cellulose conversion products or oxidation products obtained by treating cellulose or its conversion products with oxidizing or reducing bleaching agents of every kind, irrespective of whether a preliminary treatment (for example with alkalies, acids, salts or the like) has or has not preceded the bleaching operation;

(5) The conversion products obtained by heating cellulose alone or in presence of water or glycerine or the like at normal, reduced or increased pressure;

(6) The cellulose conversion products made by treating cellulose or its conversion products with alkali lye of various concentrations and, where necessary, removing the excess alkali lye by pressing, centrifuging or the like (mercerizing the cellulose), with or without subsequent washing, with or without subsequent treatment with a dilute acid and with or without previous or subsequent or simultaneous treatment with bleaching or oxidizing agents;

(7) Those cellulose conversion products obtained by treating cellulose with hot alkalies in presence or absence of salts;

(8) The cellulose conversion products which are separated from complete or incomplete solutions of cellulose or of its conversion products by suitable precipitating agents or other means and, if desired, purified by washing; for example from solutions or pastes of cellulose or cellulose hydrates or hydrocelluloses in ammoniacal cupric oxide or in any other solvent containing copper as a basis, or from solutions or pastes of cellulose or cellulose hydrates or hydro-celluloses in zinc halides, for example zinc chloride alone or in presence of an acid or a salt, or from solutions or pastes of cellulose or cellulose hydrates or hydrocelluloses in strong mineral acids, such as sulphuric acid, phosphoric acid, hydrochloric acid, arsenic acid and the like alone or mixed with each other or in admixture with other inorganic or organic acids or acid salts, or from crude or purified viscoses (cellulose xanthates), when decomposed spontaneously or by other means. Of all the cellulose conversion products separated from cellulose solutions the statement holds good that the nature of the precipitating agent is without influence on the present process;

(9) Cellulose conversion products which are obtained by treating, short of dissolution, cellulose or its conversion products (such as cellulose hydrates or hydro-celluloses) with solvents, such as strong mineral acids (for example parchmentizing acid) or zinc halides (for example zinc chloride or the like) or ammoniacal cupric oxide;

(10) Hydro-celluloses of every kind, such as are obtained, for example, by treating bleached or unbleached cellulose with dilute acids in the cold or at a raised temperature under ordinary or increased pressure or by drying in presence of acids or by treating cellulose with strong sulphuric acid of specific gravity lower than 50° Baumé in the cold, gaseous hydrochloric acid or chlorine;

(11) Oxy-celluloses of every kind.

The aforesaid conversion or oxidation products may be used in the dry, air-dry, moist or wet state. In the last two cases the percentage of water in the parent material must be taken into account when determining the strength and proportion of the solution of the base intended for the dissolution.

In the succeeding portion of the description and in the claims, wheresoever the meaning admits, the term "cellulose" is intended to include cellulose, and its conversion products such as cellulose hydrate, hydrocellulose and oxycellulose.

The conduct of the process is simple. It consists substantially in treating the cellulose with a preferably aqueous solution of a strong organic base, for example a quaternary ammonium base or a base in the aqueous solution of which a highly electrolytically dissociated hydroxide is assumed to be present or two or more such bases, in presence or absence of caustic alkali, preferably while stirring, at a temperature suitable for dissolving the cellulosic body concerned, until dissolution occurs. Instead of the base itself, there may be used mixtures of such substances as are capable of forming the base in question or substances capable of conversion with formation of the base in question.

If dissolution is effected while cooling, it is conducted preferably in a vessel adapted to be cooled either externally or internally or both externally and internally and having in addition a mixing, kneading or stirring device.

The solutions of the bodies obtained according to the present process, if desired after previous filtering or straining or centrifuging may be used for making technical products, such as artificial threads or yarns (for example artificial silk, artificial cotton, staple fibre or the like), artificial hair, films of every kind, plastic masses, coatings of every kind upon paper, textiles, leather and the like, finishings and fillings for fabrics, sizing for yarns, book cloth, artificial leather and the like.

The solutions are easily worked up into technical products, since they are readily coagulated by suitable precipitating baths, such as inorganic or organic acids, salts, alcohols, in some cases even water, or by heat, steam and the like.

The following examples illustrate the invention, the parts being by weight:—

*I*

For this example there are used 10 parts or (if the parent material contains water) a proportion corresponding with 10 parts of the parent material of any of the following parent materials:

(1) Finely subdivided sulphite-cellulose;

(2) Bleached cotton, for example in the form of medicated cotton-wool;

(3) Mercerized cellulose produced, for example in the following manner:

100 parts of sulphite-cellulose in fleece or sheet form or medicated cotton wool are impregnated with 900 to 1000 parts of a caustic soda lye of 18 to 30 per cent. strength of room temperature; the mass is left in the caustic soda lye for 6 up to 24 hours and then immediately washed or is first pressed or centrifuged until it weighs 200 to 300 parts and shaken or comminuted in a suitable apparatus (for example shredder, beater, willowing machine or the like) and, either directly after comminution or after standing for 1 up to 3 days at room temperature, washed with cold or hot water. The washed, mercerized cellulose is then pressed or centrifuged and dried in a vacuum or in the air or used in the centrifuged or pressed state, where desirable after previous comminution.

(4) Cellulose comminuted or ground in presence of water and produced, for example, in the following manner:—

200 parts of sulphite-cellulose in fleece or sheet form are stirred with 10 to 20 times their weight of water until the mixture is homogeneous, and after standing for several hours or several days at room temperature it is pressed or centrifuged until it weighs 250 to 350 parts. The residue is ground or comminuted for several hours up to 8 days in a suitable apparatus (for example shredder, beater, willowing machine, kneading machine or the like) and, if desired, dried.

(5) Cellulose previously treated with dilute mineral acids, for example according to the following directions:—

100 parts of bleached or unbleached sulphite-cellulose are boiled with 1000 to 4000 parts of hydrochloric acid of ½ per cent. strength in an open vessel for ½ up to 3 hours, then, if desired, after previous pressing or centrifuging, the product is washed and pressed or centrifuged and, if desired, dried.

(6) Viscose silk or copper silk or waste of such silks.

(7) Cellulose hydrate obtained by precipitating or treating viscose in the dissolved or undissolved state (that is to say, sulphidized alkali cellulose before its dissolution) with a dilute mineral acid, for example sulphuric acid of 5 per cent. strength, washing the precipitate and, if desired, drying.

(8) Cellulose conversion products obtained by dissolving cellulose in strong sulphuric acid and precipitating with water or dilute acids, for example according to the following directions:—

Into 1000 to 2000 parts of sulphuric acid of 60° Baumé specific gravity, cooled to −12° C., 100 parts of finely subdivided sulphite-cellulose are introduced in small portions while kneading or mixing and continuously cooling. The introduction occupies about 20 minutes. The temperature of the mass is kept at about −10° to −11° C. during the introduction. After the whole of the sulphite-cellulose is incorporated in the sulphuric acid, the product is a tough dough which may be rolled out on a glass plate and, in a thin layer, appears transparent. This dough, is continuously cooled to −10° C. to −12° C., while kneading for another ½ to 1 hour, and is then kneaded with ice water, added in small portions, until is is entirely broken up. The product (if desired after previous pressing for the purpose of recovering the sulphuric acid) is washed with water until sulphuric acid can no longer be detected in the washing water and until a test portion of the body itself, boiled with water, yields no more sulphuric acid to the water. To accelerate the washing operation, the more or less coarse product may be triturated or ground in the moist state once or several times during the washing. The washed body is now pressed or centrifuged, if necessary again triturated or ground and used either in the wet state or after having been dried in a vacuum or in the air.

Whichever of the foregoing parent materials is used it is mixed with an aqueous solution of guanidine or tetramethylammoniumhydroxide or tetraethylammoniumhydroxide or phenyltrimethylammoniumhydroxide of such concentration, that the mixture contains 10 parts of air-dry parent material and 190 to 240 parts of a solution of one of these bases of 20 to 50 per cent. strength, whereupon the mass is stirred at room temperature until it is homogeneous.

The result in the case of parent material 1, 2, 3 and 4 is merely a more or less appreciable swelling, whereas in the case of parent materials 5, 6, 7 and 8 dissolution occurs to a considerable extent.

Then, preferably while stirring or kneading, the mass is cooled to −8° to −11° C. and kept at this temperature for some seconds up to 30 minutes.

Under the action of the cold dissolution occurs in the first four cases; in the last four improvement, that is to say completion of the solution already begun. The solutions are viscous, but liquid, and may be freed from any undissolved constituents that may be present by straining, filtering or centrifuging.

Spread in thin layers on glass plates and treated with a suitable precipitating bath (for example dilute sulphuric acid), these solutions yield films which are transparent and flexible after washing and drying. They may also be worked up into artificial threads, such as artificial silk, by spinning into suitable precipitating baths (for example dilute sulphuric acid or dilute sulphuric acid in admixture with a salt).

II

The mode of operation is as in Example I, except that for dissolving the 10 parts of the parent material there are used 190 to 240 parts of a solution of 10 to 30 per cent. strength of tetramethylammoniumhydroxide or tetraethylammoniumhydroxide or phenyltrimethylammoniumhydroxide or guanidine in caustic soda lye of 5 to 10 per cent. strength.

The presence of the caustic soda enhances the solvent action of the bases. For the rest, the result is roughly as in Example I.

III

10–15 parts of dicyano-diamide, preferably pulverized, are stirred with 200–240 parts of sodium hydroxide solution of 6 per cent strength, whereupon 10 parts of air-dry cellulose mercerized by sodium hydroxide are introduced and the whole is stirred until homogeneous. The mass is cooled to $-10°$ to $-11°$ C., while stirring, and is kept at this temperature while stirring for 10–40 minutes, during which the mass freezes but can still be stirred. After thawing there is produced a liquid solution which yields a film clear and firm while wet and transparent, and flexible when dry.

I claim:

1. Process for making cellulose solutions by dissolving cellulose in guanidine.
2. Process for making cellulose solutions by dissolving cellulose in guanidine at a temperature below 0° C.
3. Process for making cellulose solutions by dissolving cellulose in an aqueous liquid containing guanidine.
4. Process for making cellulose solutions by dissolving cellulose in an aqueous liquid containing guanidine at a temperature below 0° C.
5. Process for making cellulose solutions by dissolving cellulose in an aqueous liquid containing guanidine and caustic alkali.
6. Process for making cellulose solutions by dissolving cellulose in an aqueous liquid containing guanidine and caustic alkali at a temperature below 0° C.
7. Process for making cellulose solutions by dissolving a cellulose conversion product in an aqueous liquid containing guanidine.
8. Process for making cellulose solutions by dissolving a cellulose conversion product in an aqueous liquid containing guanidine at a temperature below 0° C.
9. Process for making cellulose solutions by dissolving a cellulose conversion product in an aqueous liquid containing guanidine and caustic alkali.
10. Process for making cellulose solutions by dissolving a cellulose conversion product in an aqueous liquid containing guanidine and caustic alkali at a temperature below 0° C.
11. As a new product, a solution of cellulose in a solvent comprising water and guanidine.
12. As a new product, a solution of cellulose in a solvent comprising water, caustic alkali and guanidine.
13. The process for making cellulose solutions which comprises dissolving cellulose in a compound of the type

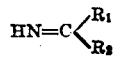

where $R_1$ and $R_2$ are $NH_2$ groups or derivatives thereof.

14. The process for making a cellulosic solution which comprises dissolving a cellulose conversion product in a compound of the type

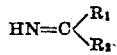

where $R_1$ and $R_2$ are $NH_2$ groups or derivatives thereof.

15. The process for making a cellulosic solution which comprises dissolving cellulose in an aqueous liquid in the presence of a compound of the type.

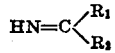

where $R_1$ and $R_2$ are $NH_2$ groups or derivatives thereof.

16. The process for making a cellulosic solution which comprises dissolving cellulose in an aqueous liquid in the presence of a hydroxide of an alkali metal and a compound of the type

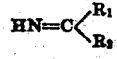

where $R_1$ and $R_2$ are $NH_2$ groups or derivatives thereof.

17. The process for making a cellulosic solution which comprises dissolving cellulose at a temperature below 0° C. in a compound of the type

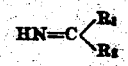

where $R_1$ and $R_2$ are $NH_2$ groups or derivatives thereof.

18. The process for making a cellulosic solution which comprises dissolving cellulose at a temperature below 0° C. in an aqueous liquid in the presence of a compound of the type

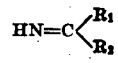

where $R_1$ and $R_2$ are $NH_2$ groups or derivatives thereof.

19. The process for making a cellulosic solution which comprises dissolving cellulose at a temperature below 0° C. in an aqueous liquid in the presence of a hydroxide of an alkali metal and a compound of the type $$HN=C\begin{matrix}R_1\\R_2\end{matrix}$$

where $R_1$ and $R_2$ are $NH_2$ groups or derivatives thereof.

20. As a new product, a solution of cellulose in a compound of the type $$HN=C\begin{matrix}R_1\\R_2\end{matrix}$$

where $R_1$ and $R_2$ are $NH_2$ groups or derivatives thereof.

21. As a new product, a solution of cellulose in an aqueous liquid containing a compound of the type $$HN=C\begin{matrix}R_1\\R_2\end{matrix}$$

where $R_1$ and $R_2$ are $NH_2$ groups or derivatives thereof.

22. As a new product, a solution of cellulose in guanidine.

23. In the process of treating cellulose, cellulose hydrate, hydrocellulose or oxycellulose, for the purpose of swelling the same or forming solutions thereof, the step which comprises treating the same with a compound of the type $$HN=C\begin{matrix}R_1\\R_2\end{matrix}$$

where $R_1$ and $R_2$ are $NH_2$ groups or derivatives thereof, the said treatment being conducted under such conditions of temperature as to produce swelling or dissolving as desired.

In testimony whereof I affix my signature.

DR. LEON LILIENFELD.